United States Patent
Jonsson

(10) Patent No.: US 7,894,822 B2
(45) Date of Patent: Feb. 22, 2011

(54) APPARATUS AND METHOD IN A CELLULAR NETWORK

(75) Inventor: Anders Jonsson, Täby (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 922 days.

(21) Appl. No.: 11/721,778

(22) PCT Filed: Dec. 17, 2004

(86) PCT No.: PCT/SE2004/001912
§ 371 (c)(1),
(2), (4) Date: Jun. 14, 2007

(87) PCT Pub. No.: WO2006/065181
PCT Pub. Date: Jun. 22, 2006

(65) Prior Publication Data
US 2008/0081635 A1     Apr. 3, 2008

(51) Int. Cl.
*H04W 72/00*    (2009.01)
(52) U.S. Cl. ............... 455/452.2; 455/67.13; 455/135; 370/332; 370/310
(58) Field of Classification Search ............ 455/561, 455/452.2, 67.13, 135, 161.3, 277.2, 67.3, 455/403; 370/332, 310
See application file for complete search history.

(56) References Cited

U.S. PATENT DOCUMENTS

| | | | |
|---|---|---|---|
| 7,181,170 B2 * | 2/2007 | Love et al. ............ | 455/67.13 |
| 7,386,277 B2 * | 6/2008 | Cho et al. ............... | 455/69 |
| 2004/0184417 A1 * | 9/2004 | Chen et al. ............. | 370/328 |
| 2004/0190486 A1 | 9/2004 | Oshiba | |
| 2004/0203476 A1 * | 10/2004 | Liu ........................ | 455/69 |
| 2004/0266358 A1 * | 12/2004 | Pietraski et al. ....... | 455/67.11 |
| 2005/0181811 A1 * | 8/2005 | Magnusson et al. ... | 455/458 |
| 2005/0250540 A1 * | 11/2005 | Ishii et al. ............. | 455/561 |
| 2006/0072508 A1 * | 4/2006 | Zou et al. ............... | 370/332 |

(Continued)

FOREIGN PATENT DOCUMENTS

EP    1 388 964 A1    11/2004
EP    1492263 A1    12/2004

OTHER PUBLICATIONS

Fukui, N. "Study of Channel Quality Feedback in UMTS HSDPA" in: Personal, Indoor and Mobile Radio Communications, 2003. PIMRC 2003. 14$^{th}$ IEEE Proceedings: Sep. 7-10, 2003; vol. 1, pp. 336-340 for Section III.

*Primary Examiner*—Charles N Appiah
*Assistant Examiner*—Marisol Fahnert

(57) ABSTRACT

A node (5) for use in a cellular network (4) to control the transmission of data from a radio base station (3) in the cellular network to a mobile terminal (1), is proposed, said node (5) comprising memory (7) for storing a channel quality value reported by the mobile terminal, and acknowledgement messages received from the mobile terminal, and calculating means (9) for calculating an adjustment value for the channel quality value based on the acknowledgement messages. The calculating means (9) is arranged to calculate said adjustment value for the perceived channel quality value taking into account at least two responses related to at least two blocks, and calculate said adjusted value using the adjustment value. The evaluation may be based on consecutive acknowledgement messages or on statistics derived from a plurality of messages.

19 Claims, 2 Drawing Sheets

U.S. PATENT DOCUMENTS

2006/0114936 A1* 6/2006 Paffen .................. 370/469
2006/0176866 A1* 8/2006 Wakabayashi ............ 370/342
2007/0070956 A1* 3/2007 Seki .................... 370/335
2007/0147289 A1* 6/2007 Nibe ................... 370/329

* cited by examiner

APPARATUS AND METHOD IN A CELLULAR NETWORK

TECHNICAL FIELD

The present invention relates in general to communications systems and in particular, cellular communication systems.

BACKGROUND

For communication in cellular communication systems it is important to control the transport data format and user to be scheduled in order to optimize the throughput in the network.

In many cellular communication systems the mobile terminals report a perceived channel quality to the base stations. This channel quality is used by the base station for scheduling, for determining the amount of data that can be transmitted to a mobile terminal at a given time and, possibly, for other purposes as well.

For example, according to the 3GPP standard for WCDMA High-speed downlink packet access (HSDPA), the mobile terminal reports to the radio base station a channel quality indicator (CQI), which reflects the channel quality perceived by the mobile terminal. The CQI is an information element contained in the associated uplink signalling. The CQI reported by the mobile terminal reflects the receiver performance capability of the UE and is based on measurements of the CPICH and is reported at a predefined rate and averaging interval defined by the network.

The CQI is reported as an integer between 0 and 30, where 0 indicates that the mobile terminal is not ready to be scheduled and that no transmission should be made to the mobile terminal. Based on, among other things, the CQI, the base station will perform scheduling, that is, select the mobile terminal to transmit to, and also select the transport block format to use when transmitting to this mobile terminal, that is, the amount of data to be transmitted.

The 3G standard specifies that the mobile terminal should report a CQI aiming for a Hybrid Automatic Repeat Request (HARQ) Block Error Rate (BLER) of 10%, meaning that the mobile terminal will on average not be able to decode 10% of the transmissions.

The 3GPP standard also specifies requirements on the CQI reporting accuracy for the mobile terminal but it is expected that the actual reporting accuracy will vary depending on mobile terminal model and make. If the mobile terminal reports an incorrect CQI, the base station will base its scheduling and selection of transport block format on erroneous data resulting in lower throughput because of a less efficient use of the High-speed downlink shared channel (HS-DSCH). In particular, some mobile terminals tend to overestimate their receiving quality. These terminals will be scheduled for transmission more often than if their CQI had been correct. Also, the transmission will not be adapted to the terminal's real ability to receive data, so that a large number of blocks will not be received correctly. These blocks will have to be retransmitted, resulting in a lower throughput. In the worst case the Block error rate (BLER) can be up to 100%. Conversely, mobile terminals that underestimate their capability by sending a too low CQI, will not be scheduled as often as they should and will exhibit a BLER lower than 10% due to a too conservative TB selection by the radio network.

Thus, to optimize the traffic in the network from an overall point of view, the network will need to adjust the CQI reported by the mobile terminal, if it is not correctly reported by the terminal itself.

One known algorithm for adjusting the CQI is based on the ACK and NACK (acknowledgement and not acknowledgement) messages received from the mobile terminal. In this algorithm, if a NACK message is received, indicating that a transmission of data was not received correctly in the mobile terminal, the CQI is decremented while for each ACK message the CQI is incremented by the same or a different value.

The WCDMA standard specifies a number of parameters that may be used to control how often a mobile terminal reports its CQI.

OBJECT OF THE INVENTION

It is an object of the invention to provide a method and an apparatus for adjusting the CQI reported from a mobile terminal in order to optimize the throughput and efficiency of the system.

SUMMARY OF THE INVENTION

The present invention achieves this object by a node for use in a cellular network to control the transmission of data from a radio base station in the cellular network to a mobile terminal, said node comprising memory for storing a perceived channel quality value reported by the mobile terminal, and acknowledgement and negative acknowledgement messages received from the mobile terminal in response to data blocks transmitted from the radio base station to the mobile terminal, and calculating means for calculating an adjustment value for the perceived channel quality value based on the acknowledgement and negative acknowledgement messages, the memory also being arranged to store an adjusted value for the perceived channel quality value, said node being characterized in that the calculating means is arranged to calculate said adjustment value for the perceived channel quality value taking into account at least two responses related to at least two blocks, and calculate said adjusted value using the adjustment value.

The object is also achieved by a method for use in a radio network for adjusting a perceived channel quality value reported by a mobile terminal to a radio base station transmitting blocks of data to the mobile terminal, wherein the mobile terminal, for each block of data transmitted to it responds with an acknowledgement message indicating that the block was correctly received or a negative acknowledgement message indicating that the block was not correctly received, said method being characterized by the steps of monitoring at least two responses, corresponding to at least two blocks of data transmitted to the mobile terminal, determining based on said at least two responses whether or not the perceived channel quality value should be adjusted, and by how much adjusting the perceived channel quality value according to what was determined.

The object is also achieved by a computer program product comprising program code which, when run in a node associated with a radio base station in a mobile telecommunications network, causes the node to perform the inventive method.

In this way, a premature lowering of the channel quality value is avoided in case the session happens to begin with a negative acknowledgement and also, conversely, the algorithm does not adjust the channel quality value up one step too early before such a decision can be based on sound data. Thus, the inventive algorithm is less likely to adjust a perceived channel quality value that already correctly reflects the terminal's ability to receive data. In a WCDMA system the perceived channel quality value will be the CQI and the acknowledgement and negative acknowledgement messages will be ACK and NACK messages, respectively. The inventive method and apparatus can be used for any cellular network in which an estimated channel quality is reported from the mobile terminal to the network.

In a first preferred embodiment the calculating means is arranged to, if said at least two responses comprises at least a predetermined number of consecutive negative acknowledgements, said predetermined number being at least two, decrease the perceived channel quality value by a predetermined amount.

In this first preferred embodiment the calculating means may also, or alternatively, be arranged to, if said at least two responses comprises at least a predetermined number of consecutive acknowledgements, said predetermined number being at least two, increase the perceived channel quality value by a predetermined amount.

Preferably, consecutive blocks of data transmitted to the mobile terminal may be considered.

The inventive way of adjusting the CQI value results in an early adjustment of the CQI as reported by the mobile terminal even for small payloads. Further, since this adjustment algorithm is adapted to small amounts of data adjustments can be made early if the mobile terminal exhibits deviating reporting characteristics. This is important since it is likely that a lot of traffic in the network will consist of small objects that do not generate enough ACKs or NACKs to deduce reliable statistics.

For example, the predetermined number of consecutive negative acknowledgements may be set to two and the predetermined number of consecutive acknowledgements may be set to ten.

In a second preferred embodiment the memory is arranged to collect data from a sufficient number of data blocks to determine a percentage of acknowledgements and negative acknowledgements, and said calculating means is arranged to calculate the number of acknowledgements and/or negative acknowledgements in such a way that if the number of negative acknowledgements indicate a block error rate higher than a predetermined threshold rate, decrease the perceived channel quality value, and if the number of acknowledgements indicate a block error rate lower than a predetermined threshold rate, increase the perceived channel quality value.

In this second preferred embodiment the method comprises the steps of collecting data from a predetermined number of data blocks, said predetermined number of blocks being sufficient to determine a percentage of acknowledgements and negative acknowledgements, and if the number of negative acknowledgements indicate a block error rate higher than a predetermined threshold rate, decrease the perceived channel quality value, and if the number of acknowledgements indicate a block error rate lower than a predetermined threshold rate, increase the perceived channel quality value.

This algorithm is adapted to larger objects transmitted in a large number of transmission blocks which generate enough ACKs and NACKs to perform a statistical analysis of the NACK rate, which then forms a solid base for the CQI adjustments for the duration of the session.

In the second preferred embodiment the predetermined threshold rate may, for example, correspond to a block error rate of 10%.

According to a third preferred embodiment of the inventive node, said memory comprises a first value defining a first measuring interval and the calculating means is arranged to, during said first measuring interval:

if said at least two responses comprises at least a predetermined number of consecutive negative acknowledgements, said predetermined number being at least two, decrease the perceived channel quality value by a predetermined amount and, if said at least two responses comprises at least a predetermined number of consecutive acknowledgements, said predetermined number being at least two, increase the perceived channel quality value by a predetermined amount and after said first measuring interval:

collecting data from a sufficient number of data blocks to determine a percentage of acknowledgements and negative acknowledgements if the number of negative acknowledgements indicate a block error rate higher than a predetermined threshold rate, decrease the perceived channel quality value, and if the number of acknowledgements indicate a block error rate lower than a predetermined threshold rate, increase the perceived channel quality value.

According to the third embodiment, in the method at least a first measuring interval is defined, and wherein during said first measuring interval, if said at least two responses comprises at least a predetermined number of consecutive negative acknowledgements, said predetermined number being at least two, decreasing the perceived channel quality value by a predetermined amount and if said at least two responses comprises at least a predetermined number of consecutive acknowledgements, said predetermined number being at least two, increasing the perceived channel quality value by a predetermined amount, and, after said measuring interval, collecting data from a predetermined number of data blocks, said predetermined number of blocks being sufficient to determine a percentage of acknowledgements and negative acknowledgements, and if the number of negative acknowledgements indicate a block error rate higher than a predetermined threshold rate, decrease the perceived channel quality value, and if the number of acknowledgements indicate a block error rate lower than a predetermined threshold rate, increase the perceived channel quality value.

The use of one algorithm for small amounts of data and changing to another algorithm for after a certain amount of data has been transmitted optimizes the behaviour of the algorithm for any size data objects.

In this document the term "mobile terminal" is intended to cover any type of end user equipment that can be used for communicating with a cellular network.

DETAILED DESCRIPTION OF PREFERRED EMBODIMENTS

Figure 1:
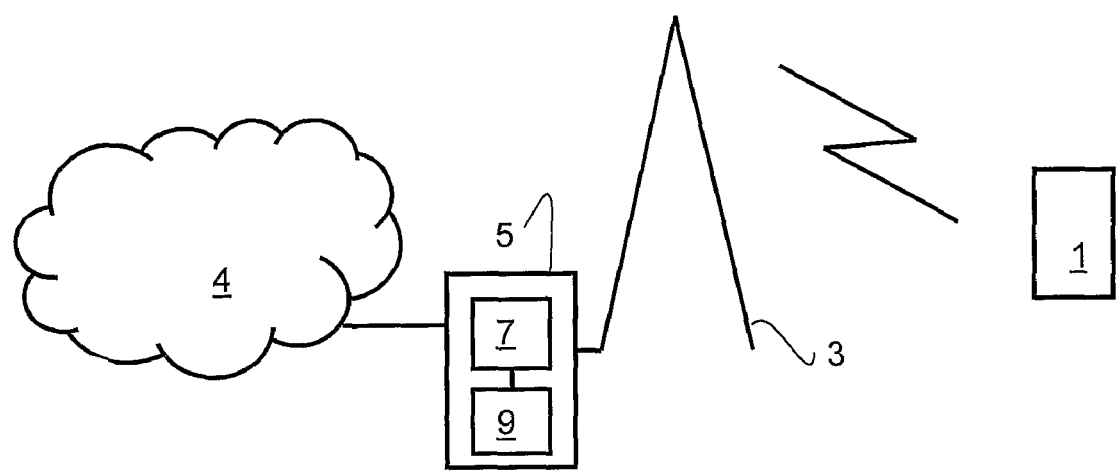
FIG. 1 illustrates schematically the communication between a mobile telecommunications network and a mobile terminal.

FIG. 1 illustrates the communication between a mobile terminal 1 and a radio base station 3 in a cellular telecommunications network 4.

As is common in the art, the radio base station 3 transmits blocks of data in the downlink direction towards the mobile terminal 1. For each block of data the mobile terminal 1 determines if the block was received correctly. If it was, the terminal sends an acknowledgement (ACK) to the radio base station 3. If the block was not received correctly the terminal sends a negative acknowledgement (NACK) to the radio base station. The terminal also transmits a channel quality indicator (CQI) to the radio base station indicating the channel quality perceived by the terminal. The CQI information is contained in the last two slots of the HS-DPCCH subframe. The person skilled in the art is familiar with the generation and transmission of CQI.

The radio base station comprises, or is connected to, CQI adjustment means 5. The CQI adjustment means comprises a memory 7 for storing the CQI value and the ACKs and NACKs received from the terminal. Further, the CQI adjustment means comprises calculating means 9, usually comprising software for calculating an adjustment value that should be added to or subtracted from the CQI value. The calculating means may comprise one or more processors. This adjustment value is determined based on a number of transmissions of data blocks to the mobile terminal as will be discussed in more detail in the following. The adjusted CQI value and/or the adjustment value are also stored in the memory 7 of the CQI adjustment means 5, where it is accessible to any function within the base station 3 that is dependent on a correct CQI value. The memory 7 also comprises any parameters needed to calculate the adjustment value, as will be discussed below.

As the skilled person will realize the division of the CQI adjustment means 5 shown in FIG. 1 is purely functional. The memory and calculation functions may be performed by the same unit or may be distributed between several units as is seen fit. Also, of course, the CQI adjustment means 5 will often be a part of a larger control unit.

According to a first embodiment of the invention, for each block of data transmitted from the radio base station to the mobile terminal, the corresponding ACK and NACK messages returned from the mobile terminal are registered along with the CQI reported from the terminal. To avoid too fast changes, the number of consecutive ACK or NACK messages is taken to indicate how well the terminal is able to receive the blocks transmitted from the radio base station.

If the number of consecutive NACK messages exceeds a first threshold this indicates that the terminal's ability to receive data is overestimated. Then the CQI reported from the terminal should be decreased to reflect better the actual conditions. Thus, if the number of consecutive NACK messages exceeds the first threshold the CQI reported by the terminal is decreased by one. If the number of consecutive ACK messages exceeds a second threshold, the CQI reported from the terminal is increased to reflect the terminal's improved ability to receive data.

The first algorithm can be expressed as follows, using the following parameters:

deltaCqi: the adjustment value, that is, the value by which the perceived CQI reported from the mobile terminal should be adjusted.

nackConsecutive: the threshold value defining the number of consecutive negative acknowledgements that should lead to the adjustment value being decremented ackConsecutive: the threshold value defining the number of consecutive acknowledgements that should lead to the adjustment value being incremented If the number of consecutive NACKs$\geq$nackConsecutive then deltaCqi=deltaCqi−1

If the number of consecutive ACKs$\geq$ackConsecutive then deltaCqi=deltaCqi+1

In order to aim at a desired BLER, the first threshold nackConsecutive, that is, the number of consecutive NACK messages required to decrement the CQI, should be considerably lower than the second threshold ackConsecutive, indicating the number of consecutive ACK messages that will cause the CQI to be incremented. For example, two consecutive NACK messages could be sufficient for a decrement while ten consecutive ACK messages would be required for an increment.

If the number of consecutive NACKs reaches the first threshold value a CQI adjustment is initiated and the count of consecutive NACKs is restarted from 0. Likewise, if the number of consecutive ACKs reaches the second threshold value, a CQI adjustment is initiated and the count of consecutive ACKs is restarted from 0.

This will result in an early adjustment of the CQI as reported by the mobile terminal even for small payloads. This first embodiment is therefore particularly well suited for the transmission of small amounts of data when the number of blocks to be transmitted is too low to obtain reliable statistics.

If no ACK or NACK is received in a TTI the CQI adjustment algorithm is paused until the next correctly decoded ACK or NACK is received.

According to a second embodiment of the invention better suited for large amounts of data, a measuring interval is determined, which should be long enough to enable statistics to be established. In one preferred embodiment 20 Transmission Time Intervals (TTI) are used. In another preferred embodiment the measurements are performed over a period of 50 TTIs. The measurements should probably cover at least 10 TTIs to produce any meaningful statistics. Also the measuring interval should be short enough to allow corrections of the CQI at reasonable time intervals.

In this second embodiment the CQI is adjusted upwards or downwards based on the average percentage of ACKs and NACKs contained in the predefined measuring interval. If the fraction of NACKs in the predetermined interval is higher than a first preset threshold the CQI will be decreased. If the fraction of NACKs in the predetermined measuring interval is lower than a second preset threshold the CQI will be increased. The predetermined thresholds may be the same, but preferably, a hysteresis is built into the adjustment algorithm, so that the rate of NACK messages required to increase the CQI is lower than the rate of NACK messages required to decrease the CQI.

Thus, the following four parameters are needed to control the CQI adjustment algorithm of the second embodiment:

Measuring interval (expressed as a number of TTIs)

NACK rate average: nackAverage=number of NACKs in the measuring interval/number of TTIs in measuring interval deltaCqi: the adjustment value, that is, the value by which the perceived CQI reported from the mobile terminal should be adjusted.

nackMinus: The NACK rate threshold for lowering the CQI nackPlus: The NACK rate threshold for increasing the CQI nackMinus should be larger than nackPlus With the above definitions the algorithm becomes:

If nackAverage>nackMinus then deltaCqi=deltaCqi−1

If nackAverage<nackPlus then deltaCqi=deltaCqi+1

For example, if the measuring interval is 20 TTIs and a BLER of 10% is desired the CQI can be decreased if the number of NACKs in the measuring interval is 2 or more.

If no ACK or NACK is received within a TTI then the CQI adjustment algorithm is paused until the next correctly decoded ACK or NACK is received.

As the skilled person will immediately realize, the same result can be achieved by determining the number of ACKs in the measuring interval and setting threshold values for the ACKs instead, since the number of ACKs is directly related to the number of NACKs.

Further, it is not necessary to register the ACK or NACK for every TTI. The second algorithm could also be used on, for example, the ACK or NACK message from every second TTI.

According to a third preferred embodiment the first and second embodiments are combined in such a way that for the first TTIs the CQI is adjusted according to the first embodiment and thereafter the CQI is adjusted according to the second embodiment.

The number of TTIs to which the first algorithm should be applied before changing to the second algorithm can be selected arbitrarily. At least 3-5 TTIs should be covered, a number of approximately 15 TTIs is considered advantageous.

The adjustment value obtained according to the first algorithm will be used as an input CQI adjustment value when starting to apply the second algorithm. It should be decided whether or not to use the ACKs and NACKS accumulated while the first algorithm is used as input to the second algorithm. Preferably, in this third embodiment the ACKs and NACKs accumulated while the first algorithm is used will not be used as input data to the second algorithm if the adjustment value has been adjusted based on the first algorithm. In this case, if the first algorithm did not lead to an adjustment of the CQI the accumulated ACKs and NACKs can be used as input to the second algorithm. Other options would be always to use the accumulated ACKs and NACKs or never to use them.

Figure 2:
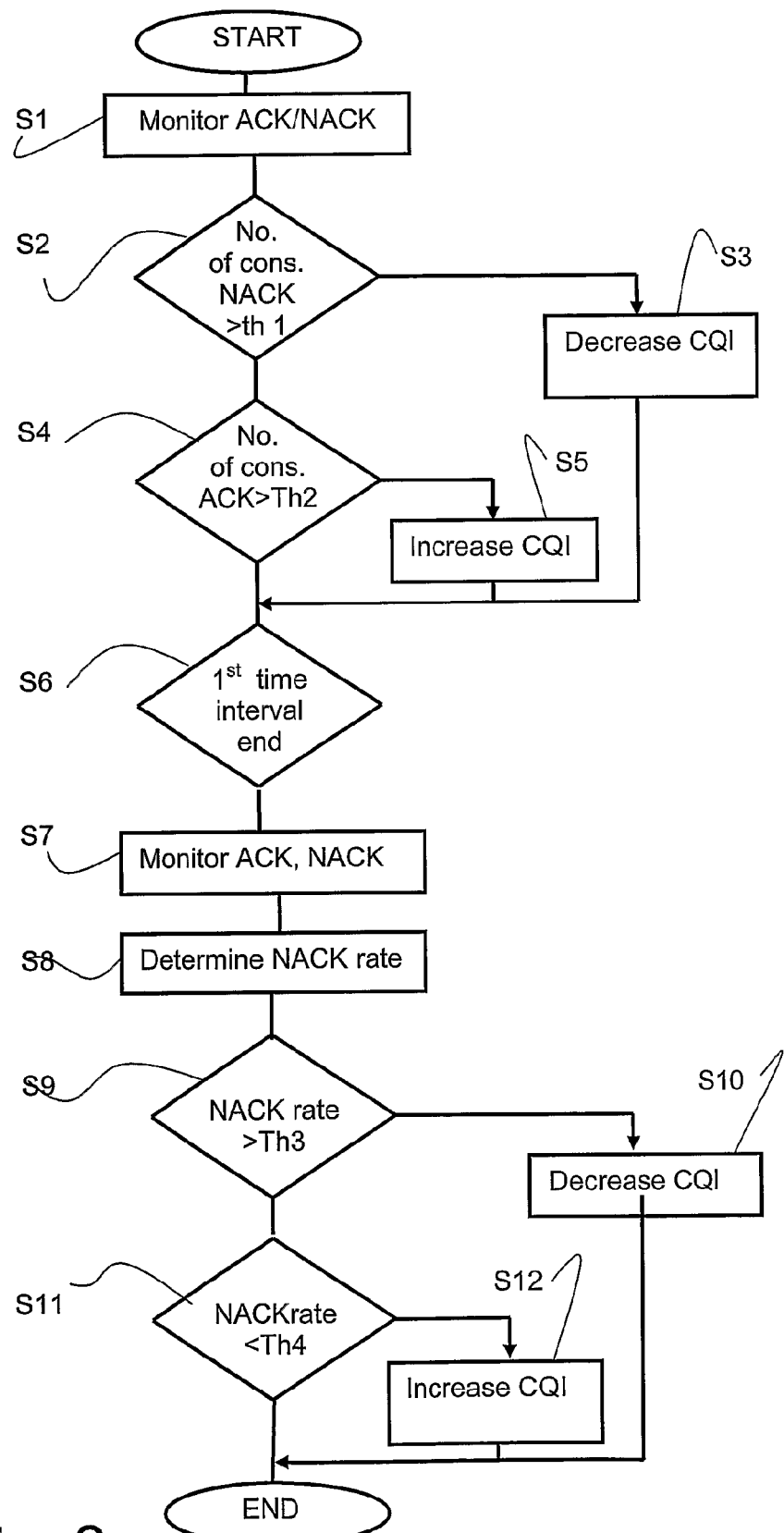
FIG. 2 is a flow chart of an embodiment of the inventive method

FIG. 2 is a flow chart summarizing the method according to the third embodiment. The following parameters are needed:

CQI: A CQI value reported from the terminal.

Int 1: A first measuring interval in which the first method is to be applied

Int 2: A second measuring interval for the second method

Th 1: A first threshold value for consecutive NACKs in the first measuring interval Th 2: A second threshold value for consecutive ACKs in the first measuring interval Th 3: A first NACK rate threshold value for the number of NACKs in the second measuring interval.

Th 4: A second NACK rate threshold value for the number of NACKs in the second measuring interval.

Steps S1 to S5 reflect the first algorithm used in the first measuring interval. Steps S7 to S12 reflect the second algorithm used in the second measuring interval. Step S6 reflects the point of change from the first algorithm to the second algorithm.

Step S1: monitor the ACK and NACK messages received from the mobile terminal.

Step S2: determine if the number of consecutive NACKs received at any given time exceeds the first threshold value. If yes, go to step S3, if no, go to step S4.

Step S3: Determine an adjustment value and decrease the CQI value by this value.

Step S4: determine if the number of consecutive ACKs received exceeds the second threshold value. If yes, go to step S5, if no, go to step S6.

Step S5: determine an adjustment value and increase the CQI value by this value.

Step S6: is the first measuring interval ended? If yes go to step S7, if no, return to step S1.

Step S7: monitor the NACK messages received during the second measuring interval.

Step S8: determine the NACK rate in the second measuring interval

Step S9: Is the NACK rate higher than the first rate threshold value? If yes, go to step S10; if no, go to step S11.

Step S10: determine an adjustment value and decrease the CQI value by this value. End of procedure.

Step S11: Is the NACK rate lower than the second rate threshold value? If yes, go to step S12; if no, end of procedure Step S12: determine an adjustment value and increase the CQI value by this value. End of procedure.

After steps S10, S11 and S12, the procedure could resume again at step S7 to calculate another adjustment value if desired.

In each of the embodiments discussed above three special cases can occur, which may be handled, for example, as follows:

If the CQI reported by the mobile terminal is 0 the adjusted CQI is also set to 0.

If the CQI adjustment algorithm generates a result of more than 30 then the adjusted CQI is set to 30.

If the CQI received is not 0 but the adjustment algorithm generates a result of less than 1 then the adjusted CQI is set to 1.

At present the adjustment value deltaCqi for a mobile terminal can only be kept for as long as it is communicating with the network. If it becomes idle the adjusted value is lost and the next time the mobile terminal wants to communicate with the network the CQI will have to be adjusted again. Since it is likely that the error in determining the CQI will often be a systematic error in the mobile terminal itself, keeping the adjusted CQI value may be advantageous if and when possible.

Although the invention has been discussed in the above with respect to a WCDMA system the skilled person will realize that it can be implemented in any cellular communications network in which a channel quality estimate is reported by the mobile terminals to the network.

The invention claimed is:

1. A node for use in a cellular network to control the transmission of data from a radio base station in the cellular network to a mobile terminal, said node comprising memory for storing a perceived channel quality value reported by the mobile terminal, and acknowledgement and negative acknowledgement messages received from the mobile terminal in response to data blocks transmitted from the radio base station to the mobile terminal, and calculating means for calculating an adjustment value for the perceived channel quality value based on the acknowledgement and negative acknowledgement messages, the memory also being arranged to store an adjusted value for the perceived channel quality value, said node being characterized in that the calculating means is arranged to calculate said adjustment value for the perceived channel quality value taking into account at least two responses related to at least two blocks, and calculate said adjusted value using the adjustment value.

2. A node according to claim 1, wherein the calculating means is arranged to, if said at least two responses comprises at least a predetermined number of consecutive negative acknowledgements, said predetermined number being at least two, de-crease the perceived channel quality value by a predetermined amount.

3. A node according to claim 2, wherein the predetermined number of consecutive negative acknowledgements is set to two.

4. A node according to claim 1, wherein the calculating means is arranged to, if said at least two responses comprises at least a predetermined number of consecutive acknowledgements, said predetermined number being at least two, increase the perceived channel quality value by a predetermined amount.

5. A node according to claim 4, wherein the predetermined number of consecutive acknowledgements s is set to ten.

6. A node according to claim 5, wherein said predetermined threshold rate corresponds to a block error rate of 10%.

7. A node according to claim 1
wherein the memory is arranged to collect data from a sufficient number of data blocks to determine a percentage of acknowledgements and negative acknowledgements, and said calculating means is arranged to calculate the number of acknowledgements and/or negative acknowledgements in such a way that if the number of negative acknowledgements indicate a block error rate higher than a predetermined threshold rate, decrease the perceived channel quality value, and if the number of acknowledgements indicate a block error rate lower than a predetermined threshold rate, increase the perceived channel quality value.

8. A node according to claim 1, wherein said memory comprises a first value defining a first measuring interval and the calculating means is arranged to, during said first measuring interval:
if said at least two responses comprises at least a predetermined number of consecutive negative acknowledgements, said predetermined number being at least two, decrease the perceived channel quality value by a predetermined amount and, if said at least two responses comprises at least a predetermined number of consecutive acknowledgements, said predetermined number being at least two, increase the perceived channel quality value by a predetermined amount and after said first measuring interval:
collecting data from a sufficient number of data blocks to determine a percentage of acknowledgements and negative acknowledgements if the number of negative acknowledgements indicate a block error rate higher than a predetermined threshold rate, decrease the perceived channel quality value, and
if the number of acknowledgements indicate a block error rate lower than a predetermined threshold rate, increase the perceived channel quality value.

9. A base station for use in a cellular telecommunications system, characterized in that it comprises a node according to claim 1.

10. A cellular telecommunications system comprising at least a first base station arranged to communicate with at least one mobile terminal, said system being characterized in that it comprises a node according to claim 1 for controlling the transmission of data from the radio base station to the at least one mobile terminal.

11. A method for use in a radio network for adjusting a perceived channel quality value reported by a mobile terminal to a radio base station transmitting blocks of data to the mobile terminal, wherein the mobile terminal, for each block of data transmitted to it responds with an acknowledgement message indicating that the block was correctly received or a negative acknowledgement message indicating that the block was not correctly received, said method being characterized by the steps of
monitoring at least two responses, corresponding to at least two blocks of data transmitted to the mobile terminal,
determining based on said at least two responses whether or not the perceived channel quality value should be adjusted, and by how much
adjusting the perceived channel quality value according to what was determined.

12. A method according to claim 11, wherein the monitoring step includes Monitoring at least two responses, corresponding to at least two consecutive blocks of data transmitted to the mobile terminal.

13. A method according to claim 11, wherein if said at least two responses comprises at least a predetermined number of consecutive negative acknowledgements, said predetermined number being at least two, decreasing the perceived channel quality value by a predetermined amount.

14. A method according to claim 13 wherein the predetermined number of consecutive negative acknowledgements is two.

15. A method according to claim 11, wherein if said at least two responses comprises at least a predetermined number of consecutive acknowledgements, said predetermined number being at least two, increasing the perceived channel quality value by a predetermined amount.

16. A method according to claim 15, wherein the predetermined number of consecutive acknowledgements is ten.

17. A method according to claim 11, comprising the steps of
collecting data from a predetermined number of data blocks, said predetermined number of blocks being sufficient to determine a percentage of acknowledgements and negative acknowledgements, and
if the number of negative acknowledgements indicate a block error rate higher than a predetermined threshold rate, decrease the perceived channel quality value, and
if the number of acknowledgements indicate a block error rate lower than a predetermined threshold rate, increase the perceived channel quality value.

18. A method according to claim 17, wherein said predetermined threshold rate corresponds to a block error rate of 10%.

19. A method according to claim 11 wherein at least a first measuring interval is defined, and wherein during said first measuring interval,
if said at least two responses comprises at least a predetermined number of consecutive negative acknowledgements, said predetermined number being at least two, decreasing the perceived channel quality value by a predetermined amount and if said at least two responses comprises at least a predetermined number of consecutive acknowledgements, said predetermined number being at least two, increasing the perceived channel quality value by a predetermined amount, and, after said measuring interval, collecting data from a predetermined number of data blocks, said predetermined number of blocks being sufficient to determine a percentage of acknowledgements and negative acknowledgements, and if the number of negative acknowledgements indicate a block error rate higher than a predetermined threshold rate, decrease the perceived channel quality value, and if the number of acknowledgements indicate a block error rate lower than a predetermined threshold rate, increase the perceived channel quality value.

\* \* \* \* \*